United States Patent [19]

Elton et al.

[11] Patent Number: 5,036,165
[45] Date of Patent: Jul. 30, 1991

[54] SEMI-CONDUCTING LAYER FOR INSULATED ELECTRICAL CONDUCTORS

[75] Inventors: Richard K. Elton, Altamont; William R. Schultz, Jr., Schenectady, both of N.Y.

[73] Assignee: General Electric Co., Schnectady, N.Y.

[21] Appl. No.: 555,713

[22] Filed: Jul. 23, 1990

Related U.S. Application Data

[62] Division of Ser. No. 351,235, May 15, 1989, which is a division of Ser. No. 643,908, Aug. 23, 1984, Pat. No. 4,853,565.

[51] Int. Cl.$^5$ ............................................. H01B 9/02
[52] U.S. Cl. ........................ 174/102 SC; 174/105 SC; 174/106 SC; 174/120 SC
[58] Field of Search .................. 174/102 SC, 105 SC, 174/106 SC, 120 SC

[56] References Cited

U.S. PATENT DOCUMENTS

| | | | |
|---|---|---|---|
| 1,861,182 | 5/1932 | Hendey et al. | 174/102 SC |
| 2,409,893 | 10/1946 | Pendleton et al. | 201/76 |
| 2,415,652 | 2/1947 | Norton | 174/102 SC |
| 2,498,238 | 2/1950 | Berberich et al. | 174/102 SC |
| 2,943,242 | 6/1960 | Schaschl et al. | 361/212 |
| 3,098,893 | 7/1963 | Pringle et al. | 174/102 SC |
| 3,158,770 | 11/1964 | Coggeshall et al. | 310/214 |
| 3,268,766 | 8/1966 | Amos | 361/212 |
| 3,354,331 | 11/1967 | Broeker et al. | 310/196 |
| 3,684,821 | 8/1972 | Miyauchi et al. | 174/102 SC |
| 3,891,880 | 6/1975 | Britsch | 310/196 |
| 3,947,278 | 3/1976 | Youtsey | 106/26 |
| 3,974,314 | 8/1976 | Fuchs | 428/212 |
| 4,001,616 | 1/1977 | Loneseth | 310/45 |
| 4,107,092 | 8/1978 | Carnahan et al. | 252/511 |
| 4,207,482 | 6/1980 | Neumeyer | 310/196 |
| 4,308,476 | 12/1981 | Schuler | 310/45 |
| 4,369,389 | 1/1983 | Lambrecht | 310/214 |
| 4,371,745 | 2/1983 | Sakashita | 174/102 SC X |
| 4,403,163 | 9/1983 | Armerding et al. | 310/213 |
| 4,473,765 | 9/1984 | Butman, Jr. et al. | 310/215 |
| 4,510,077 | 4/1985 | Elton | 252/502 |
| 4,853,565 | 8/1989 | Elton | 174/102 SC X |

FOREIGN PATENT DOCUMENTS

| | | | |
|---|---|---|---|
| 1126975 | 12/1956 | France | 174/102 SC |
| 64964 | 3/1987 | Japan | 361/220 |

OTHER PUBLICATIONS

Brown Boveri Review Jan. 1970, "Manufacturing And Testing Of Roebel Bars", by P. Mart & R. Schuler, pp. 25–31.

Moses, G. L., Electrical Insulation, McGraw Hill, 1st Ed. 1951, pp. 2 and 3.

*Primary Examiner*—Morris H. Nimmo
*Attorney, Agent, or Firm*—Nixon & Vanderhye

[57] ABSTRACT

A semi-conducting pyrolyzed glass fiber layer equalizes the electrical potential on the exterior surface of an insulated conductor when the layer covers the surface. The layer prohibits the development of a corona discharge and bleeds off any electrical charge developed thereon when the layer is electrically coupled to a body having a known potential. The insulated conductor may be windings in a dynamoelectric machine.

2 Claims, 1 Drawing Sheet

SEMI-CONDUCTING LAYER FOR INSULATED ELECTRICAL CONDUCTORS

This is a division of application Ser. No. 07/351,235, filed May 15, 1989 which is, in turn, a divisional of application Ser. No. 643,908 filed Aug. 23, 1984 now issued as U.S. Pat. No. 4,853,565, the entire contents of which is hereby incorporated hereinto by reference. This invention is also related to commonly assigned U.S. Pat. No. 4,510,077 issued Apr. 9, 1985 from application Ser. No. 548,338 filed Nov. 3, 1983 which is also hereby incorporated by reference.

BACKGROUND OF THE INVENTION

This invention relates to a semi-conducting pyrolyzed glass fiber layer covering an insulated electrical conductor which prohibits the development of a corona discharge when an electrical potential exists between the conductor and region adjacent the exterior surface of the insulator.

In many electrical devices, an electrical potential exists between a conductor and the regions immediately adjacent the exterior surface of an insulator surrounding the conductor. In a high powered electrical apparatus such as a dynamoelectric machine, the stationary armature core is generally made of laminations which define a cylindrical bore and which also define circumferentially spaced radial slots opening into the bore and axially extending substantially the length of the stator core. Heavily insulated electrical windings, or armature bars, are disposed in the slots. A high electrical potential difference exists between the windings or armature bars and the members of this stator defining the slots which are at an electrical ground.

OBJECTS OF THIS INVENTION

It is an object of this invention to provide an improved cable for carrying electrical current.

SUMMARY OF THE INVENTION

In one embodiment of this invention an electrical cable is provided with an internal grading layer of semi-conducting pyrolyzed glass fiber in electrical contact with a cable conductor.

In a further embodiment of this invention, an electrical cable is provided with an exterior layer of semi-conducting pyrolyzed glass fiber in contact with an exterior cable insulator and in electrical contact with a predetermined reference potential.

BRIEF DESCRIPTION OF THE DRAWINGS

The subject matter which is regarded as the invention is particularly pointed out and distinctly claimed in the concluding portion of the specification. The invention, however, together with further objects and advantages thereof, may best be understood by reference to the following description taken in connection with the accompanying drawing in which:

DETAILED DESCRIPTION

Figure 1:
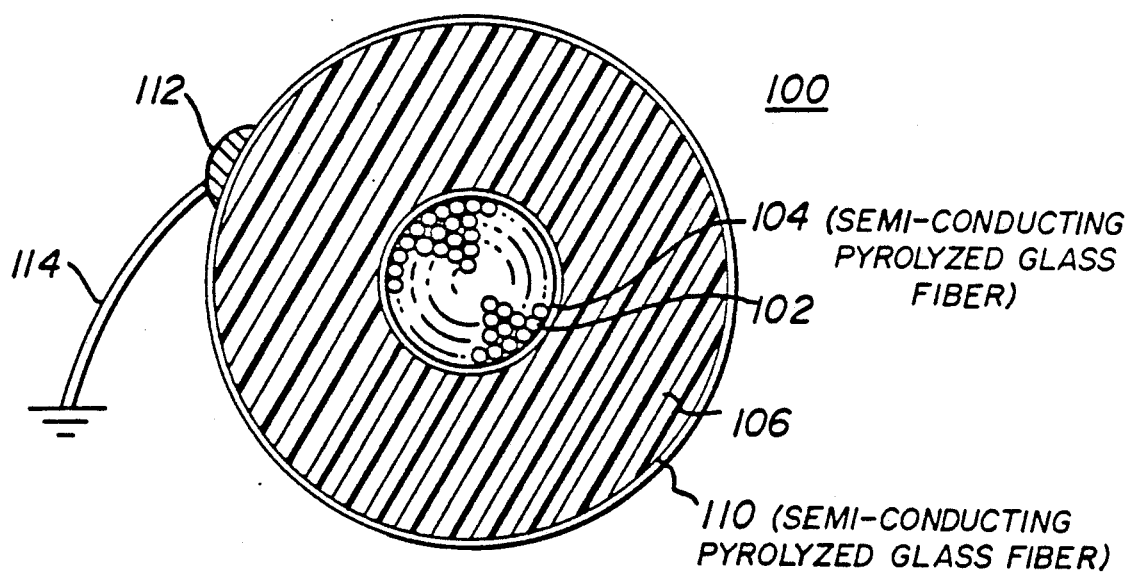
FIG. 1 is a cross sectional view of a cable.

As used herein, the word "semi-conducting" refers to a material which has a resistivity intermediate that of a good insulator, which is recognized to have a resistivity in the range of $10^{12}$ ohms per square or more, and that of a good conductor, which is considered as having a resistivity of $10^{-1}$ ohms per square or less. The recommended range of resistivity for layer 18 is 200 to 100,000 ohms per square. It is to be recognized herein that the depth of layer 18, as illustrated in the FIGURE, is exaggerated for descriptive reasons. Also, it is to be recognized that the depth of layer 18, as illustrated in the FIGURE, is exaggerated for descriptive reasons. Also, it is to be recognized that layer 18 may be classified by some strict standards as an insulator. However, for purposes of understanding, layer 18 is shown as a distinct layer in the FIGURE.

One method of making the semi-conducting pyrolyzed glass fiber, having a resistivity within the above-noted range, is to heat treat glass fibers in the substantial absence of oxygen and in the presence of an effective amount of organic compound which organic compound is pyrolyzed to secure the desired semi-conducting characteristics. A detailed description of this method, and other comparable methods, of making the semi-conducting pyrolyzed glass fibers is disclosed in the application of Richard K. Elton entitled "Semiconductive Glass Fibers and Method", Ser. No. 548,338, filed on Nov. 3, 1983, now issued as U.S. Pat No. 4,510,077 and assigned to the same assignee as the present application and incorporated herein in its entirety by reference thereto.

FIG. 1 illustrates a cross sectional view of a cable utilizing a semi-conducting pyrolyzed glass fiber layer to equalize the electric charge on the exterior of the insulator of the cable and a semi-conducting layer utilized as an internal grading layer surrounding the conductors within the cable. Cable 100 includes a plurality of conductive strands 102 surrounded by an internal grading layer 104. The internal grading layer is a semi-conducting pyrolyzed glass fiber layer as disclosed herein. Internal grading layer 104 equalizes the electric charge about conductive strands 102.

An insulation 106 surrounds internal grading layer 104. On the external surface of insulation 106, a semi-conducting pyrolyzed glass fiber layer 110 equalizes the electrical potential thereon. Semi-conducting layer 110 is electrically connected by coupling means 112 to ground by wire 114. In a fashion similar to that described above, semi-conducting layer 110 bleeds off any static electric charge or electric charge developed on the exterior surface of insulation 106 due to an electrical potential difference between conductive strands 102 and the ambient environment. It is to be understood that cable 100 could utilize internal grading layer 104 without utilizing semi-conducting layer 110. Also, cable 100 could utilize semi-conducting layer 110 without including internal grading layer 104.

The above description details several embodiments of the invention, however, it is to be understood that various other modifications may be made therein and the claims are intended to cover all such modifications that fall within the true spirit and scope of the invention.

What is claimed is:

1. A cable adapted to carry electrical current therein comprising:
   an electrical conductor;
   an insulator substantially surrounding said conductor, and
   an internal grading layer including a semi-conducting pyrolyzed organic material and glass fiber layer having a resistivity in the range of 200 to 10,000,000 ohms per square in electrical contact with said conductor.

2. A cable as in claim 1 further including means for maintaining a substantially uniform electrical potential over said cable's expanse which includes a semi-conducting pyrolyzed organic material and glass fiber layer, having a resistivity in the range of 200 to 10,000,000 ohms per square, being in intimate contact with the exterior surface of said insulator and being in electrical contact with a coupling means having a predetermined electrical potential.

* * * * *